United States Patent

Rigotti

[15] 3,659,841

[45] May 2, 1972

[54] STACKER FOR DOCUMENT CARDS

[72] Inventor: James M. Rigotti, Rochester, Minn.

[73] Assignee: International Business Machines Corporation, Armonk, N.Y.

[22] Filed: Nov. 4, 1970

[21] Appl. No.: 86,781

[52] U.S. Cl. .......... 271/88

[51] Int. Cl. .......... B65h 31/14

[58] Field of Search .......... 271/88, 86, 64

[56] References Cited

UNITED STATES PATENTS

| | | | |
|---|---|---|---|
| 2,373,029 | 4/1945 | Kiesling | 271/88 X |
| 2,181,995 | 12/1939 | Keil | 271/88 |

*Primary Examiner*—Joseph Wegbreit

*Attorney*—Hanifin and Jancin and Keith T. Bleuer

[57] ABSTRACT

A stacker for document cards having a card receiving pocket, a rotatable roller yieldably disposed at the top of the pocket by means of a cantilever spring, and a supporting plate for the cards in the pocket and yieldably held from downward movement in the pocket by means of a spring of the constant tension type, that is, a coiled spring so constructed as to provide a return force that is constant per unit of width as the spring is unwound from the coil. The spring applied to the supporting plate has a relatively narrow terminal portion which is effective for providing a certain force on the supporting plate for the first portion of the stack of cards formed in the pocket and has a relatively wide portion providing a somewhat higher force on the supporting plate for later cards being stacked in the pocket. As the cards enter the pocket, they deflect the cantilever spring while making contact with the roller; and the spring and roller move the cards and the supporting plate downwardly in the card pocket, with the spring preventing a jamming of the cards initially as they enter the pocket and also preventing a subsequent movement of the card stack away from the roller as the card stack increases in height so that the roller continues to control the cards as they enter the pocket.

7 Claims, 7 Drawing Figures

*INVENTOR*
JAMES M. RIGOTTI
BY.
ATTORNEY

STACKER FOR DOCUMENT CARDS

BACKGROUND OF THE INVENTION

The invention relates to document cards and more particularly to stackers for such cards.

Lonald L. Amundson and I have previously proposed in our pending patent application, Ser. No. 859,655, filed Sept. 22, 1969, now U.S. Pat. No. 3,604,704, for "Stacker for Document Cards" a stacker in which the cards in a card receiving pocket are supported by means of a supporting plate acted on by a coil spring. The stacker disclosed in this application, Ser. No. 859,655, now U.S. Pat. No. 3,604,704 has been found very suitable for small and medium height stacks, and even for high stacks of cards when the cards are quite dry; however, when the cards are quite moist and thereby more flexible than ordinary, it has been found that the cards bend and jam when entering the pocket for high stacks of cards.

SUMMARY OF THE INVENTION

It is an object of the present invention to provide an improved stacker for document cards having a support for cards in a stacker pocket which has such a biasing force on it that the initial cards may enter into the pocket without jamming due to excessive force from the card support and so that, as the stack of cards grows, it is nevertheless held up in proper position without undue downward movement so that the individual cards do not interfere with each other and jam in reaching the uppermost surface of the stack.

In a preferred form, the stacker of the invention includes a roller contacted by each card as it enters the stacker pocket, with the roller being spring biased by means of a leaf spring so that the roller moves upwardly slightly for the thickness of a card as each card is moved into position unto the stack; and the stacker includes also a support for the card stack having a restraining force thereon. The restraining force on the support is due to a multiwidth spring of the constant tension type, that is, a coiled spring so constructed as to provide a return force that is constant per unit of width as the spring is unwound from the coil. The spring used in the stacker of the invention is multi-width so as to provide a relatively low force on the card support for the initial cards stacked, such as for a stack height of 3 ½ inches; and, due to the stepped width of the spring, the spring for the last few inches of cards stacked puts a relatively high, constant force on the card support, with the higher force being approximately 50 percent more than the lower force, a narrow range of spring force which is not obtainable from a relatively short coil spring of resilient wire that would be stretched axially of the spring coil for relatively long movements of the card support.

DESCRIPTION OF THE PREFERRED EMBODIMENT

Figure 1:
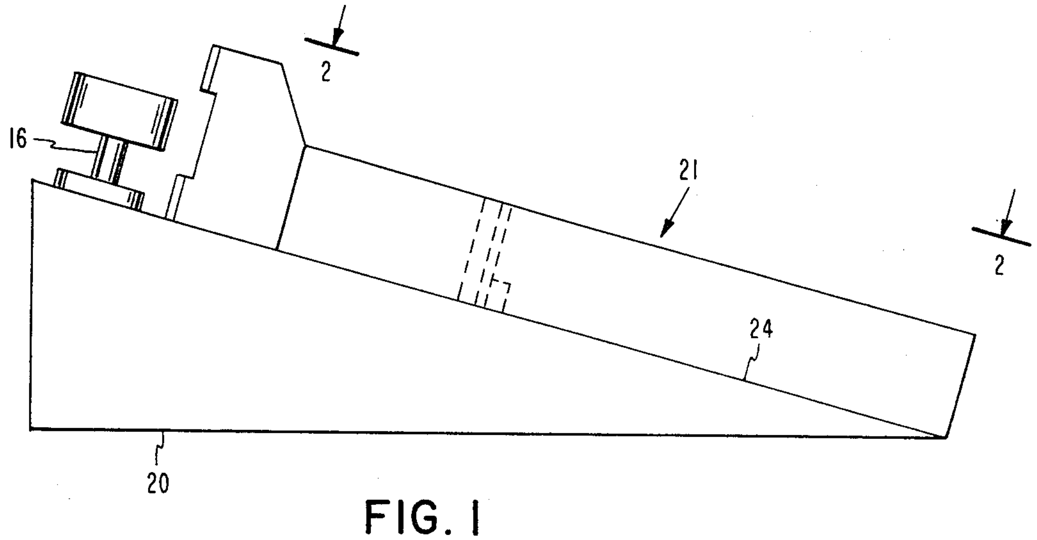
FIG. 1 is an end elevational view of a machine utilizing document cards in its operation and incorporating the stacker of the invention.

Referring now to the drawings, the illustrated document card machine includes a friction belt 10 for the purpose of transporting a series of document cards 11. The belt travels over a series of rolls 12, 13, 14, and 15 positioned within the belt; and these rolls are disposed on shafts or axles 16, 17, 18, and 19 that are fixed with respect to a machine frame 20 so that the shafts 16–19 extend approximately at an angle of 15° with respect to vertical as shown in FIG. 1.

The machine includes also a card stacker 21, and the stacker comprises a pair of vertically extending guide blocks 22 and 23 and a base 24 extending at substantially 15° with respect to horizontal. The guide blocks 22 and 23 and the base 24 define a pocket 25 for receiving a stack of cards 11.

The machine includes belt supporting rolls 26, 27, and 28 which are respectively rotatably supported by means of mountings 29, 30, and 31. The belt moves in the direction indicated by the arrow A about the rolls 12–15, and the rolls 26 and 27 are respectively disposed in positions just prior to the rolls 13 and 14 considering the direction of movement of the belt 10. The rolls 26 and 27 hold the belt moved inwardly with respect to lines of tangent connecting the rolls 13, 14, and 15, as shown. The roll 28 is disposed just below the roll 15 and is spaced just sufficiently from the roll 15 so that a document card 11 may pass along with the belt 10 through the nip between the roll 15 and roll 28.

A pressure shoe 32 is provided adjacent the periphery of the roll 14 and is mounted on a cantilever leaf spring 33. The pressure shoe 32 is moved toward the roll 14 by means of a plurality of springs 34, and the upward movement of the leaf spring 33 and thereby the shoe 32 is limited by screws 35. A card stop 36 of resilient material is fixed with respect to the mounting 29 on the side of the stacker 21 opposite to that on which the pressure shoe 32 is disposed, and a card guide 37 is positioned adjacent the pressure shoe 32 for the purpose of directing a card 11 downwardly into the pocket 25. A roller 38 is disposed at the upper end of pocket 25 and is rotatably carried by means of a leaf spring 39 arranged as a cantilever and fixed by means of a rivet 40 with respect to the mounting 29.

A base plate 41 is movable longitudinally of the pocket 25 and has a portion extending into and traveling in a longitudinal slot 42 provided in the base 24. This part of the plate 41 within the slot 42 is so fixed with respect to the remained of the plate 41 that the upper surface of the plate 41 is disposed at a small acute angle of about 7°, for example, with respect to the slot 42 and with respect to the guide blocks 22 and 23 as may be seen from FIG. 3, whereby the cards 11, as they are stacked in the pocket 25, extend at 7° with respect to the sides of the stack. In this connection, the angle at which the plate 41 is disposed with respect to the guide blocks 22 and 23 assists the card 11 in snapping off the pressure shoe 32 and entering the pocket 25, without presenting a large resisting force component to the card.

A spring 43 fixed at its upper end by means of a pin 44 extending through a hole formed in the spring 43 functions to yieldably urge the plate 41 upwardly in the pocket 25. The spring 43 is substantially flat transversely and is coiled onto a spool 45 having a shaft 46 extending through it which is fixed with respect to the plate 41. The spring 43 need not be anchored at its end to the spool 45 but may simply be loosely coiled onto the spool 45.

Figures 4, 5, 6:
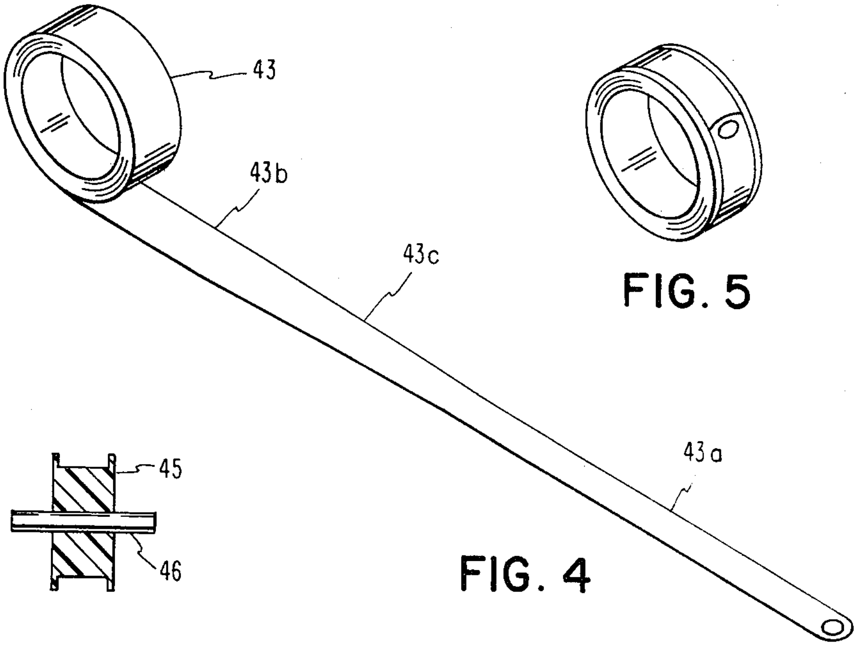
FIG. 4 is a perspective view of a partially unrolled spring used in the stacker.
FIG. 5 is a perspective view of the spring in its fully rolled-up condition.
FIG. 6 is a sectional view on an enlarged scale taken on line 6—6 of FIG. 2.
Figure 7:
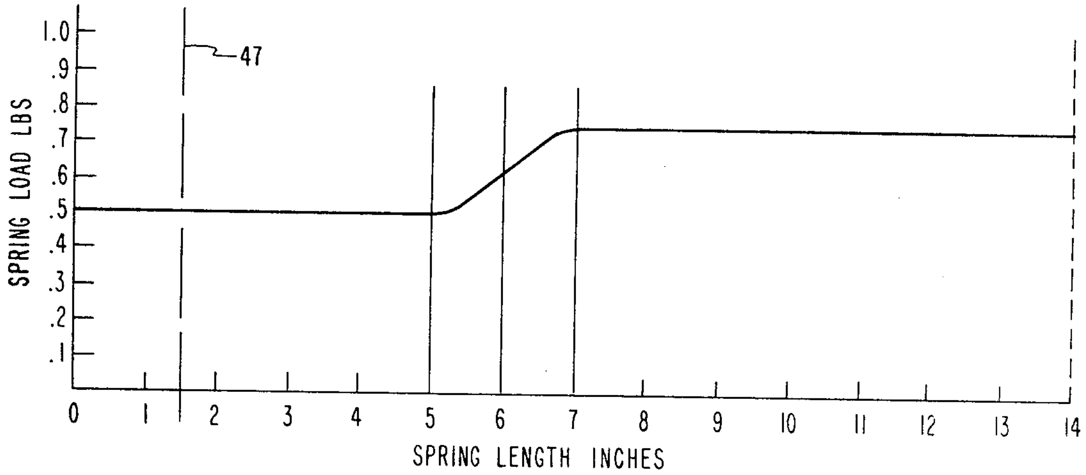
FIG. 7 is a graph showing the restraining force from the spring as the spring is unrolled from its fully rolled-up condition.

The spring 43 is of the constant tension type, that is a coiled spring so constructed as to provide a return force that is constant per unit of width as the spring is unwound from the coil. Springs of this type are sold by the Hunter Spring Division of Ametek, Incorporated, under its trademark NEG ATOR and a method of making such a spring is disclosed in U.S. Pat. No. 2,609,192. The spring 43 in free state is in the form of coil shown in FIG. 5 and has a relatively narrow terminal end 43a and a relatively wide portion 43b which are connected by a continuously widening portion 43c. As the plate 41 moves downwardly from its uppermost position in pocket 25, the spring portion 43a provides an initial constant return force for the first 3 ½ inches of movement; the widening portion 43c provides a gradually increasing force on the plate 41 for the next 2 inches of movement; and the wide portion 43b provides a constant higher return force on the plate 41 for the next 7 inches of movement until the plate 41 reaches the end of travel at which the pocket 25 is completely filled with cards 11. Referring to the graph of FIG. 7, it is apparent that the spring 43 is partially uncoiled for 1 ½ inches at the upper limit of travel of the plate 41 (at line 47) and that the force from spring 43 as it is unrolled stays constant at one-half pound for the first 3 ½ inches of movement of plate 41, then gradually increases for the next 2 inches of unwinding and then remains the same at three-fourths pound for the remainder of unwind of 7 inches.

In operation, the cards are inserted one by one into the nip between the roller 28 and the roll 15 so that the belt 10 in its movement moves the cards 11 edgewise toward the pocket 25. The cards 11 pass over the roll 27 as transported by the belt 10 and pass into contact with a pinchpoint formed by roll 14 and pressure shoe 32 and then into contact with the card guide 37 which directs the cards downwardly edgewise into the pocket 25. The cards pass beneath the roller 38 and as they enter the pocket 25 completely, they snap off the pressure shoe 32 and move into contact with the card stop 36 which cushions and stops the cards. As the cards 11 enter the pocket 25 one by one, they build up in the form of a stack which is supported by plate 41; and as the stack increases in height, the plate 41 moves downwardly against the action of the spring 43 so as to maintain the top of the stack adjacent the lower horizontal surface of the mounting 29.

The stacker may be useful with many different types and sizes of documents; however, the stacker has been found particularly suitable for small cards such as, for example, cards having a length of about 3 ¼ inches and a width of 2 ⅝ inches. Such a card of the document type weighs about 0.0017 pound. The spring 39 may, for example, exert a downward force on the stack of cards 11 of 0.55 pound. The weight of a stack of the cards 11 in the pocket 25, as the cards increase in stacking height, may vary from 0 to 4.5 pounds; and the base 24 may, for example, be of aluminum or steel. The co-efficient of friction between the base 24 and the sliding stack of cards 11 as it moves downwardly in the pocket 25 is approximately equal to the tangent of the angle of declination of the base 24 which, in this case, is 15°. The declination of 15° is provided so that the stack of cards 11 in the pocket 25 just barely moves down the declining surface of the base 24 with no appreciable force exerted on the stack of cards from the top.

Figure 3:
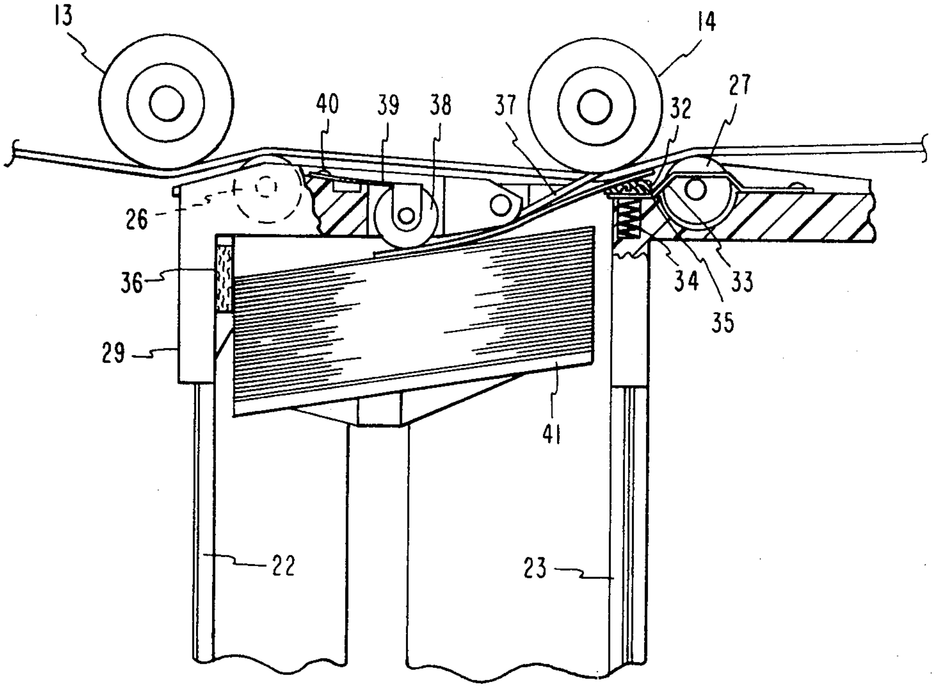
FIG. 3 is a view similar to FIG. 2 but with certain parts being broken away to show other internal parts.
Figure 2:
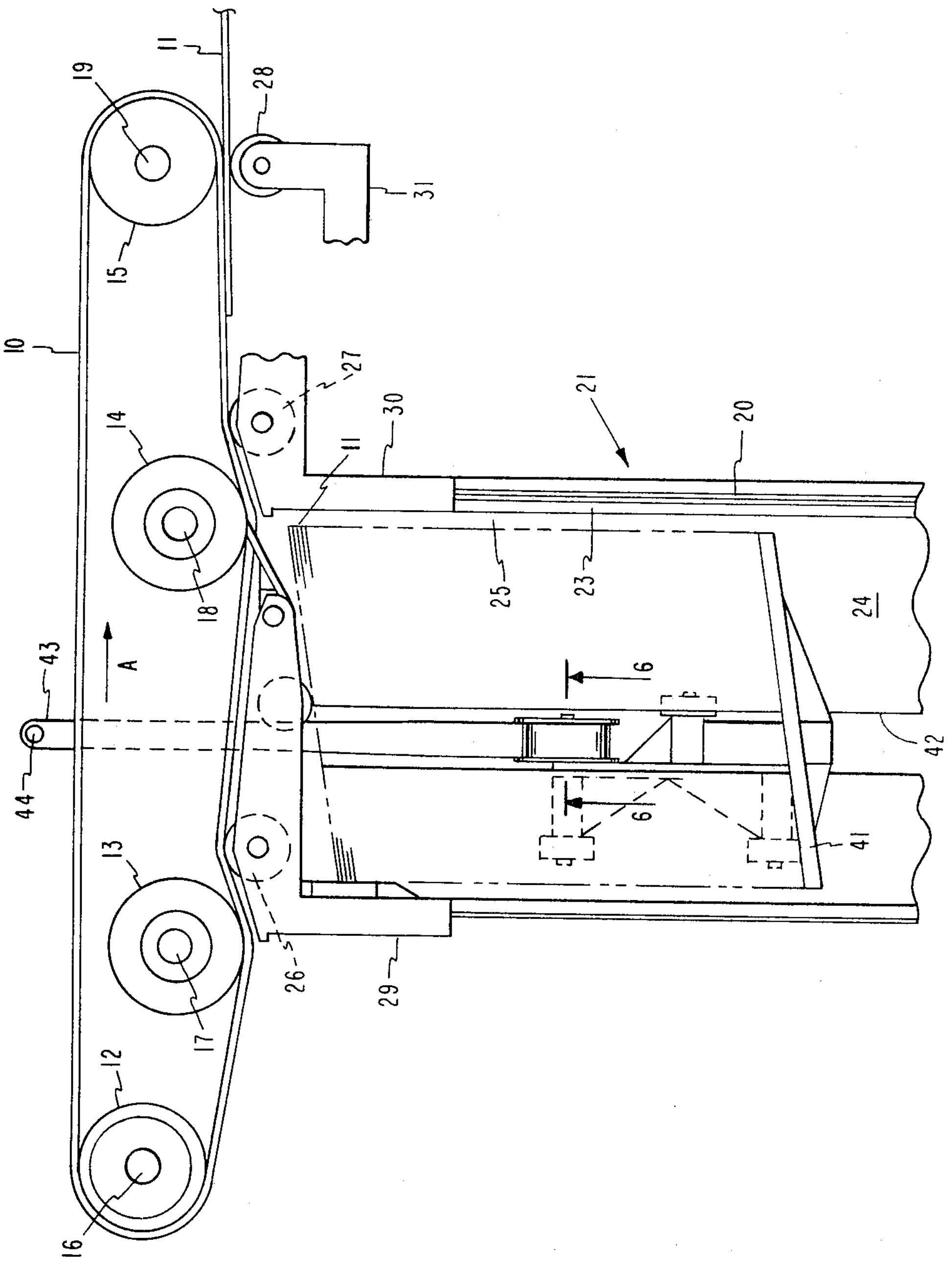
FIG. 2 is a plan view of the stacker taken from line 2—2 of FIG. 1.

As each card enters the pocket 25, it makes contact with the roller 38 and rotates the roller. This movement of a card beneath the roller 38 moves the roller 38 upwardly against the spring 39 which yields for the thickness of the card, and the spring 39 subsequently forces the stack of cards downwardly so as to move the plate 41 downwardly in the pocket 25 to maintain the uppermost card in the stack in close proximity to the lower surface of the mounting 29 substantially as shown in FIG. 3. The yielding effect of the spring 39 always takes place uniformly as the pocket 25 becomes filled with cards regardless of the varying inertia of the cards stacked.

Each of the cards 11 as it travels into the pocket 25 on top of previous cards 11 in the pocket 25 drivingly rotates the roller 38; and the momentum of the roller 38 has the function of providing a frictional drive force to the card that propels the card toward the card stop 36 and assists the card in clearing the pressure shoe 32. This momentum also has the additional effect of counteracting rebound of the card as it strikes the stop 36 so that the cards present an aligned edge in their stacked condition in the pocket 25. The roller 38 stops after each card 11 reaches its position on top of the stack of cards 11 in the pocket 25 and remains stationary until the next card 11 strikes it and causes it to rotate again.

As above mentioned, the spring 43 initially provides a force of only one-half pound on the plate 41; and, therefore, the cards 11 move into the pocket beneath the roller 38 without the roller 38 exerting such a high force on the uppermost card of the stack that could well cause a buckling of the card about transverse axes or bend lines, even though the cards 11 may be relatively moist and may thus bend quite easily. This stacking action under the influence of the plate 41 having a force of one-half pound thereon continues for the first 3 ½ inches of cards stacked on the plate 41; and then subsequently, as cards continue to move into the pocket 25, the force on the plate 41 increases gradually from one-half pound to three-fourths pound and remains at three-fourths pound for the continued movement of the plate 41 for its last 7 inches of movement until the pocket 25 is full. Due to the higher force on the plate 41, subsequent to the stack reaching a height of 7 inches, the cards of the stack in the pocket 25 remain in contact with the roller 38 even though vibration of the machine in particular tends to move the cards 11 downwardly in the pocket 25 and tends to cause a separation of the stack from the roller 38. If such a separation were allowed to occur, card jamming could well result, since a preceding card without being restrained by the roller 38 might fall on the stack of cards 11 in the pocket 25 other than in flat condition so that the preceding card would block the subsequent card. The spring 43 thus provides a return force on the plate 41 which initially is quite low and finally is slightly higher, on the order of 50 percent higher. Such a variable return force of this small but significant variation on the plate 41 has been found necessary for high stacks of document cards 11, such as, for example, on the order of 12 inches stack height, when the cards are moist, as is often the case in practice; and the multi-width spring 43 advantageously provides this slight increase in force which, as a practical matter, is not possible to obtain from a conventional coiled spring of practical length for this large a movement of the plate 41 which would apply return force by being drawn out axially to separate its coils. Since such a coil spring would have too high a spring rate, the constant tension spring 43 thus prevents cards 11 from jamming for the first cards as well as for the last cards moving into the pocket 25.

It is to be understood that the invention is not to be limited to the specific constructions and arrangements shown and described, except only insofar as the claims may be so limited, as it will be apparent to those skilled in the art that changes may be made without departing from the principles of the invention.

What is claimed is:

1. A stacker for document cards comprising:

means forming a pocket adapted to hold a stack of document cards;

means for moving the cards one at a time edgewise into the pocket from one side of the pocket to form a card stack;

a card support disposed in said pocket and movable downwardly in the pocket as the stack of cards in the pocket grows in height; and a coiled spring effective on said card support and arranged to uncoil as the support moves down in said pocket with an increasing number of document cards in the pocket, said spring being of the type that provides a return force that is constant per unit of width as the spring is uncoiled and having a relatively narrow width as the spring is initially uncoiled in an initial range of movement of the support downwardly in said pocket and having a relatively wide width as the spring is uncoiled in a subsequent range of movement of the support downwardly in said pocket so as to apply an initial relatively low constant return force on said support and to provide a relatively high constant return force on said support in said subsequent range of movement of said support.

2. A stacker as set forth in claim 1, said spring including a spring portion which gradually increases in width from the narrower portion of the spring to the wider portion of the spring.

3. A stacker as set forth in claim 1, said relatively high constant force provided by said spring being about 1 and ½ times said relatively low force and the complete range of movement of said card support being about 12 inches.

4. A stacker as set forth in claim 1, said spring being in the form of a coil carried by said support and having its terminal end fixed, with the terminal end of said spring being the narrower portion of the spring and with the narrower and wider portions of the spring being connected by means of a spring portion gradually increasing in width from the narrower portion to the wider portion.

5. A stacker as set forth in claim 1, said stacker including a roller disposed at the upper end of said pocket which the cards contact as they enter the pocket and a cantilever spring having said roller mounted on one end and which yields as the cards enter the pocket.

6. A stacker as set forth in claim 5, said pocket being inclined at a small angle with respect to horizontal.

7. A stacker for document cards comprising:

means forming a pocket adapted to hold a stack of document cards;

means for moving the cards one at a time edgewise into the pocket from one side of the pocket to form a card stack;

a card support disposed in said pocket and movable downwardly in the pocket as the stack of cards in the pocket grows in height; and a coiled spring effective on said card support and arranged to uncoil as the support moves down in said pocket with an increasing number of document cards in the pocket, said spring being of the type that provides a return force that is constant per unit of width as the spring is uncoiled and said spring having a portion that gradually increases in width from a narrow width to a relatively wide width as the spring is uncoiled so as to provide with this portion of the spring a gradually increasing return force on said support as the support moves downwardly in said pocket with an increasing number of document cards being moved into said pocket.

* * * * *